6 Sheets—Sheet 1.

F. WINDHAUSEN.
Apparatus for Making Ice and Cooling.

No. 111,292.    Patented Jan'y 24, 1871.

F. WINDHAUSEN.
Apparatus for Making Ice and Cooling.

No. 111,292.

6 Sheets—Sheet 2.

Patented Jan'y 24, 1871.

6 Sheets—Sheet 4.

F. WINDHAUSEN.

Apparatus for Making Ice and Cooling.

No. 111,292. Patented Jan'y 24, 1871.

Witnesses:
Phil. F. Larner.
Frank H. Jackson.

Inventor:
Franz Windhausen
By Wm C. Dodd
Attorney.

6 Sheets—Sheet 5.

F. WINDHAUSEN.
Apparatus for Making Ice and Cooling.

No. 111,292. Patented Jan'y 24, 1871.

Witnesses:
Phil. P. Larner
Frank A. Jackson

Inventor:
Franz Windhausen
By Wm. C. Wood
Attorney.

F. WINDHAUSEN.
Apparatus for Making Ice and Cooling.

No. 111,292.

6 Sheets—Sheet 6.

Patented Jan'y 24, 1871.

Witnesses:
Phil. R. Larner
Frank A. Jackson

Inventor:
Franz Windhausen
By Wm. C. Wood
Attorney.

UNITED STATES PATENT OFFICE.

FRANZ WINDHAUSEN, OF BRUNSWICK, GERMANY, ASSIGNOR TO LOUIS SCHNEIDER, C. T. BUDDECKE, AND JOHN A. BLAFFER, OF NEW ORLEANS, LOUISIANA.

IMPROVEMENT IN APPARATUS FOR MAKING ICE AND COOLING.

Specification forming part of Letters Patent No. 111,292, dated January 24, 1871.

*To all whom it may concern:*

Be it known that I, FRANZ WINDHAUSEN, of the city of Brunswick, Germany, have invented certain new and useful Improvements in Machines for Making Ice, and for general refrigerating purposes.

My improvements relate to that class of machines which effect the process of refrigerating by the use of mechanical means for the manipulation of atmospheric air, in combination with a free use of water, independent of any volatile liquids or so-called freezing solutions.

My invention consists in certain novelties in construction, combination, and arrangement, by which I am enabled to put into practical operation a machine for the manufacture of ice, and for general refrigeration, simple and comparatively inexpensive, durable in its several parts, of little comparative bulk, of great capacity, and which can be readily operated with but little expenditure of driving-power; and I do hereby declare that the following specification, taken in connection with the drawings furnished and forming a part of the same, is a clear, true, and exact description thereof.

Six sheets of drawings are presented, of which Sheets 1 to 4, inclusive, and Figures 1 to 5, inclusive, exhibit the ice-machine proper in its various views. With few exceptions, capital letters are used for reference in these figures. Sheets 5 and 6 are devoted to the refrigerating apparatus, in connection with which small letters of reference are used.

Figure 1:
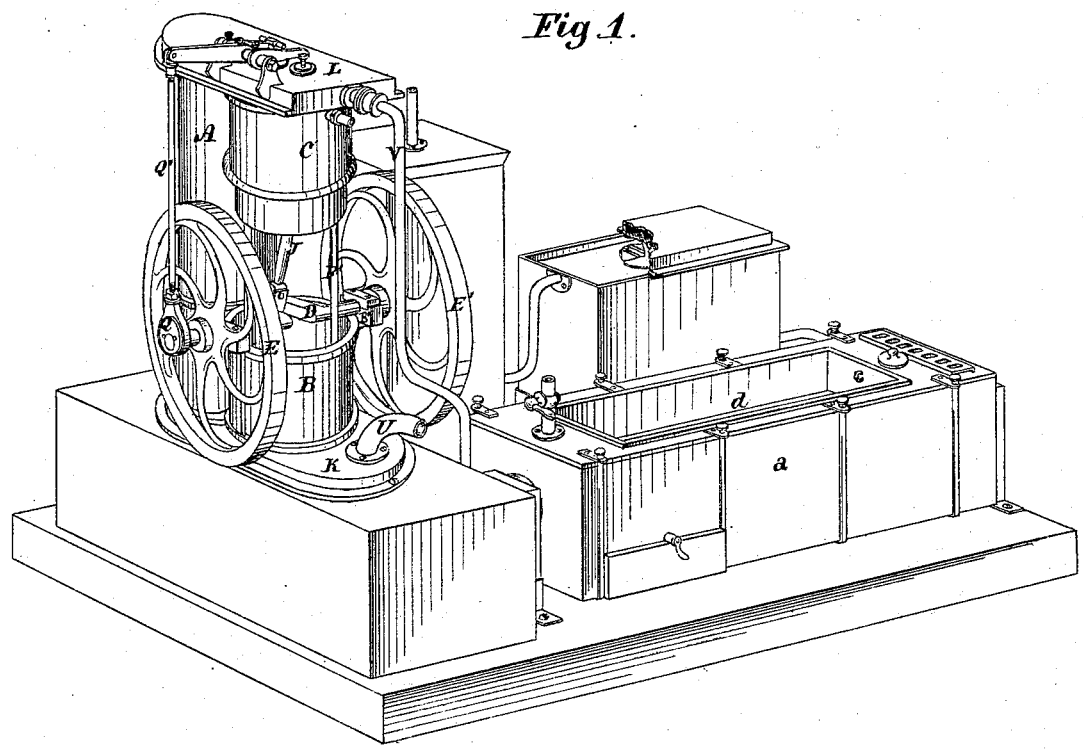
Figure 2:
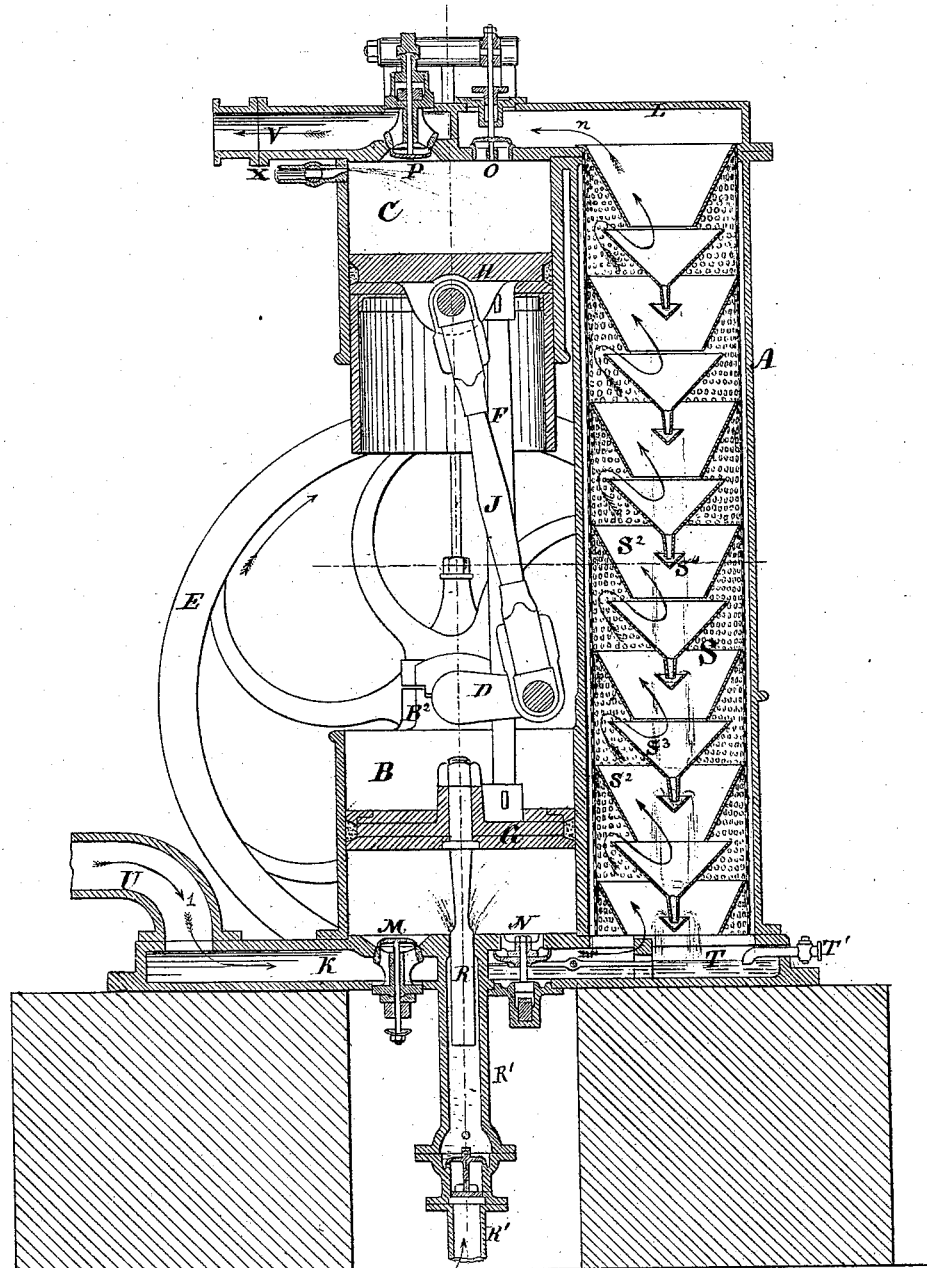
Figure 3:
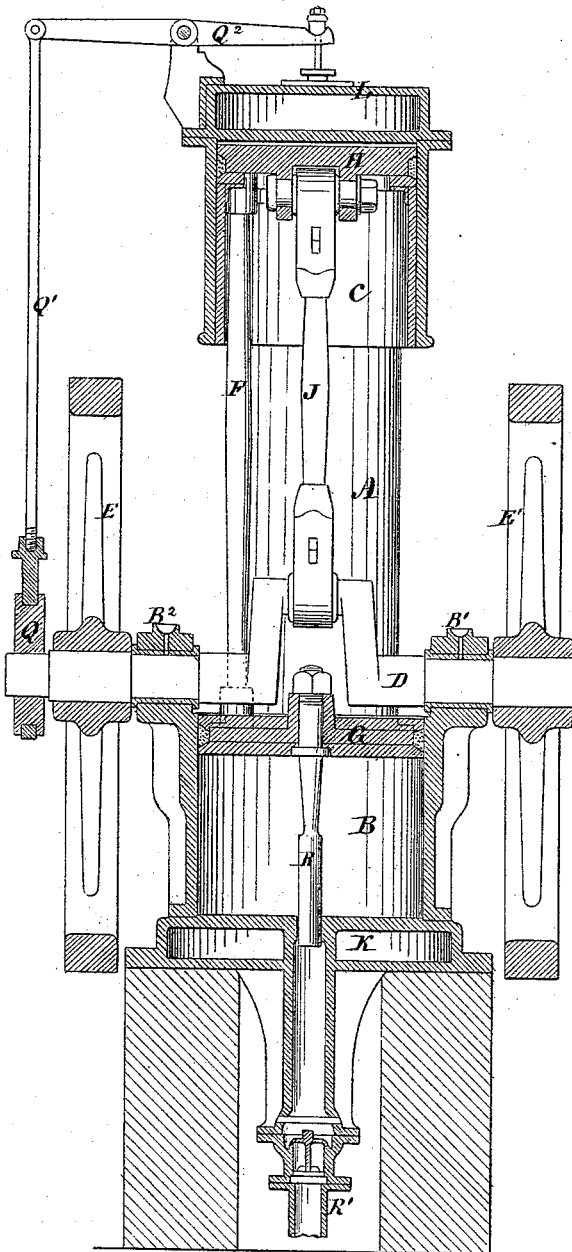
Figure 4:
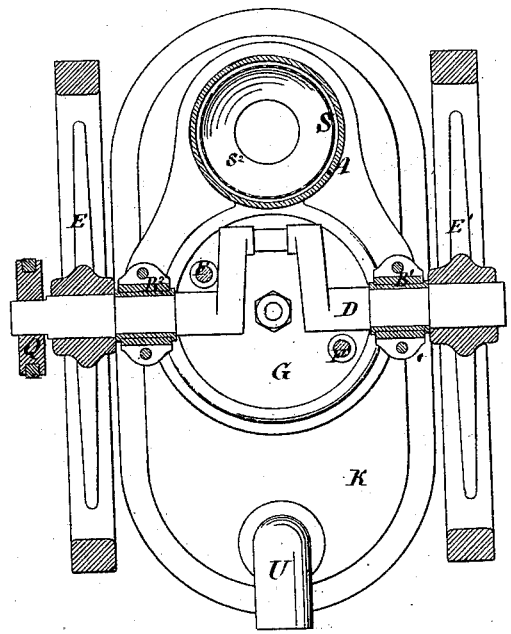
Figure 5:
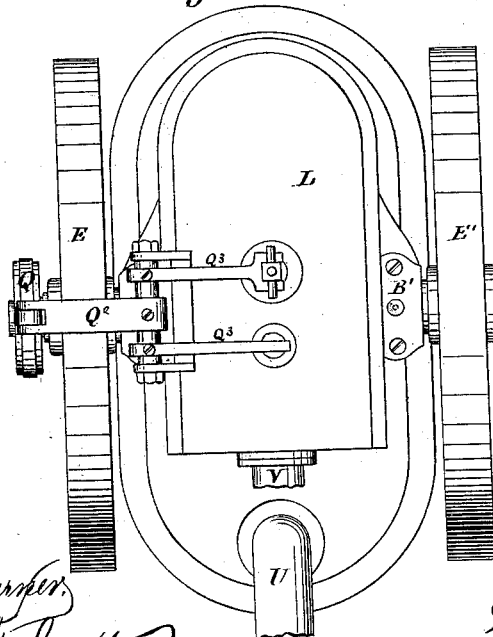
Figure 6:
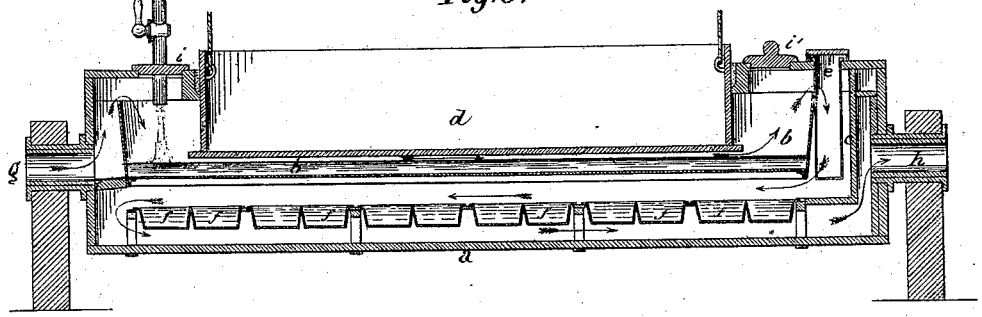
Figure 7:
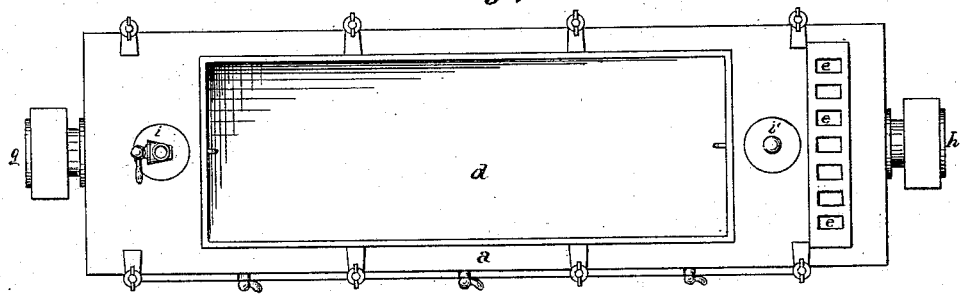
Figure 8:
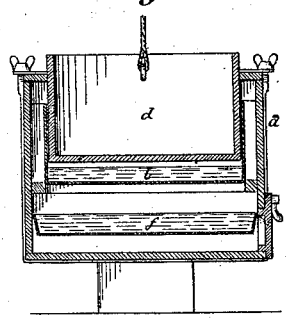
Figure 9:
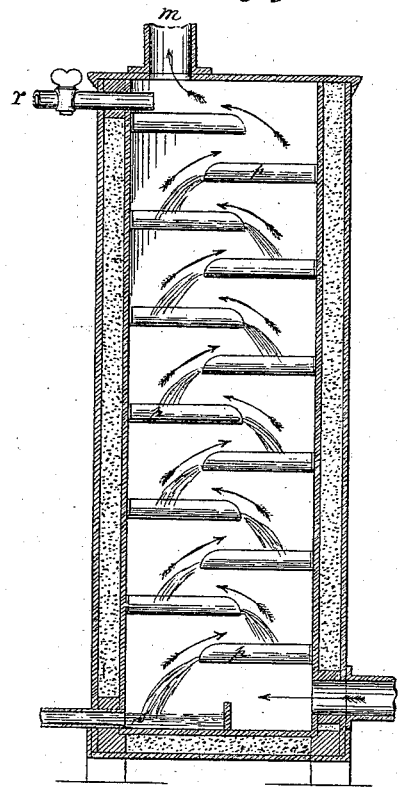
Figure 11:
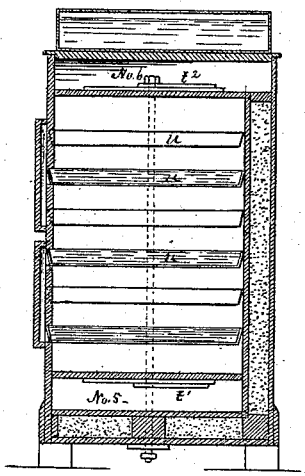
Figure 10:
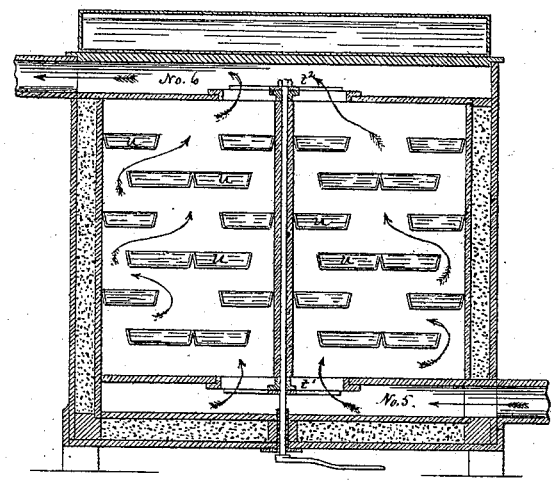

Fig. 1, Sheet 1, represents my improved condensing or ice machine in perspective, with the refrigerating apparatus attached. Fig. 2, Sheet 2, represents the condensing apparatus in cross vertical section. Fig. 3, Sheet 3, represents the condensing-machine in cross vertical section, on a line at right angles to the center of the section, as shown in Fig. 2. Fig. 4, Sheet 4, represents a horizontal cross-section of the lower part of the condensing-machine, as viewed from the line of the main or driving shaft. Fig. 5, Sheet 4, represents a top view of the machine. Fig. 6, Sheet 5, represents, in longitudinal vertical section, the principal refrigerating apparatus. Fig. 7 represents in top view the principal refrigerating apparatus. Fig. 8 represents the principal refrigerating apparatus in a central cross vertical section. Fig. 9, Sheet 6, represents in cross vertical section the water-cooling apparatus. Fig. 10 represents an auxiliary refrigerating-chamber in longitudinal vertical section. Fig. 11 represents the auxiliary refrigerating-chamber in cross vertical section.

Figs. 1 to 5 on Sheets 1 to 4, inclusive, refer particularly to the condensing-engine, and the letters of reference are the same in these, while in Figs. 6 to 11, Sheets 5 to 6, another set of letters is used.

A in each of the figures represents a vertical tank or chamber, which, with its internal arrangements, constitutes the condenser. B and C are two single-acting air-pump cylinders. The latter is placed above the other on a vertical line. $B^1$ and $B^2$ are the main-shaft bearings, which are mounted upon the top edge of the lower pump-cylinder B. D is the crank-shaft, on the ends of which are mounted two fly or balance wheels, E and E', properly keyed to the shaft. These wheels may be used as belt-pulleys. F and F' are piston-rods, both of which are attached at opposite ends, respectively, to the air-pump pistons G and H in the pump-cylinders B and C. J is the connecting-rod between the crank-shaft D and the piston H. A rotary movement of the crank causes a vertical reciprocating movement to the piston H, thence (being connected therewith by rods F) to the piston G. K is the base-plate on which the machine is mounted, and which, in turn, is supported by suitable foundations of masonry or timber. It is provided with interior channels for the induction of air and water, and for the eduction of the same. It is also, in part, the cylinder-head of the pump B. L is the top plate or cover of the machine, which is also provided with interior channels for the transmission of air, and constitutes, in part, the cylinder-head of the pump C. M is an induction-valve of ordinary construction, through which atmospheric or other air is drawn into the pump B by the upward movement of its piston; and N is the eduction-valve, provided with means of adjustment, by which it may be opened at any stated degree of pressure. O is the induction-valve, and P is the eduction-valve, for pump C. Both of these valves are operated by positive motion, conveyed by means of an eccentric, Q, on the main shaft, a connecting-rod, $Q^1$, and suitable levers, $Q^2$ and $Q^3$, the same being operated in a common and well-known manner. R' is an induction-pipe, filled with water, by natural pressure or otherwise, to a level nearly or quite corresponding in height with the under side of the bed-plate K. There is placed within the pipe R', at or near its point of connection with the supply-pipe, a check-valve, to prevent any backward flow of water after it has once entered therein. R is a rod-plunger, connected to and moving with the piston G of pump B, and is fitted for entering and nearly filling with its bulk the interior of the pipe R' when the piston G is depressed. This rod-plunger has a variable diameter, as shown, so that the displacement of water is lessened during the latter portion of its downward stroke. S represents the "water apparatus," and is located within the tank A. It consists, in part, of a vertical shell, corresponding in form and nearly equal in size to the tank in which it is located. Its sides are filled with small holes. Within this shell, and secured to its sides at proper distances, are large funnels, $S^2$. Between these are smaller funnels, $S^3$, attached to the larger ones, and suspended from them. These latter are provided with pointed basins, $S^4$, at their lower ends. In each case the lower ends of the funnels $S^2$ are adjacent to the tops of the funnels $S^3$, while the lower ends of the latter extend downward into the interiors of the funnels $S^2$. T is a waste-water reservoir, into which the water used during the operation is discharged. T' is an outlet-pipe connected with this reservoir, from which water may from time to time be drawn, or to which may be attached a graduated cock. U is the supply-pipe for conveying atmospheric or other air to the pump B. V is the eduction-pipe which conveys the cold air to the refrigerating apparatus.

Having thus described in detail the respective parts of the machine, I will now proceed to describe its operation. It is to be supposed, by way of illustration, that the pumps are in position, as shown in the cross vertical section, Fig. 3, Sheet 3. Piston G in pump B is at its highest elevation. As it ascended air was drawn in through valve M, via pipe U, in the directions of arrows 1. The rod-plunger R is nearly raised out of the water-pipe R', which fills with water from supply-pipe through valve, as shown by arrow 2. By the revolution of the main shaft the plunger G is forced downward, compressing the air, and at the same time, by the insertion of the rod-plunger R into the pipe R', the water contained therein is forced outward and upward against the under face of the piston in a circular flaring jet, thereby cooling the air and absorbing the caloric generated by the act of compression. It will be observed that this plunger-rod R has a reduced diameter at a point midway between the plunger G and the end of the rod. It is obvious that when this smaller part enters the pipe R' the injection of water is somewhat lessened, which would not be the case if the rod were constructed with a uniform diameter. The valve N, having been weighted to any certain degree of pressure, opens when the force of compression within the pump is equal to or greater than its power of resistance, through which the surplus water and the compressed air charged with water flow; the water remaining in the reservoir T, and the air passing into the condenser through the lower funnel $S^2$, up the outside of the funnel $S^3$, thence below the lower edge of the next succeeding funnel $S^2$, and so on upward through the series, as is indicated by the several arrows. The air is charged heavily with water within the pump B, and as it is forced against and through the perforated sides of the condenser, the water is deposited thereon, which, trickling down the sides, enters the several funnels $S^2$, thence into funnels $S^3$, and is poured therefrom at each vessel $S^4$, into the one next below, and so on, until it is finally discharged into the reservoir T. On arriving at the top of the condenser, the air is nearly free from water, and at arrow $n$ it is ready for delivery by the injection-valve O to the expansion-pump C. The said valve is opened by the positive action of the eccentric Q rod $Q^1$, and lever $Q^2$, at the moment the plunger H commences to descend; and if the pressure in the condenser be at, say, three atmospheres, the valve O should close at about one-third of its downward movement, the remaining two-thirds movement causing the air to be expanded, so as to be about equal to an atmospheric pressure. As the piston H commences to ascend, the valve P is opened by positive action of lever $Q^3$, and mechanism already described, and the freezing air is discharged through it to the pipe V, and refrigerating apparatus beyond. The valve P is then closed, and the several operations in the two pumps are continued.

Experiments with this apparatus, operated under a pressure of three atmospheres in the condenser, demonstrated that the expanded air, as delivered from the machine, had a temperature of about sixty degrees below zero. It is evident that, with a variation of the degree of compression in the condenser, a corresponding variation in the degree of cold would be produced. For the purposes of ventilation and the cooling of buildings, it is only necessary to convey the cold air from the pipe V for general distribution. For the purpose of cooling liquids, they may be introduced, if desired, into the expansion-pump C through a cock, X, provided for that purpose, and discharged through the valve P by the upward movement of the plunger H.

I will now proceed to describe my invention so far as it relates to the apparatus which, in combination with my condensing-machine, is especially adapted to the purpose of making ice. Referring to Sheets 5 and 6, Figs. 6 to 11, inclusive, it will be found presented in longitudinal vertical section, Fig. 6; cross-vertical, Fig. 8, and top view, Fig. 7.

$a$ is an oblong square-sided horizontal tank, mounted upon hollow trunnions, placed at each end, and so arranged that it may be turned over readily and returned to its proper position. These trunnions have bearings set upon any suitable foundation. $b$ is an inner tank, water-tight. Its width is slightly less than the outer tank, considerably shorter, and shallower. The bottom of this tank $b$ projects beyond the end at the left, and is connected permanently and closely with the inside of that end of the tank $a$. The ends and sides of this tank extend upward to within an inch or so of the top of the sides of the tank $a$. This tank $b$ is the main vessel for containing the fluid to be frozen. $c$ is a vertical partition, filling the inside of the right end of the tank $a$ for a portion of its height, extending downward from the cover to a point several inches from the bottom. At its lower end it connects with a short horizontal floor-partition. $d$ is a movable cover in the tank $a$. It is shaped like an oblong box, with square sides, without any top. It is slightly narrower than the inner tank $b$, and considerably shorter. Its depth is somewhat greater than that of the tank $b$, and when placed with its bottom on the floor of that tank its sides should project above the sides of the outer tank $a$.

The bearings between the sides and ends of the cover $d$ and the adjacent edges of the top of the tank $a$ are provided with loosely-packed stuffing, so as to prevent any ready escape of cold air or induction of the atmosphere. The cover is to be provided with cords and pulleys, which sustain its weight, and by which it can be raised or lowered at pleasure. $e$ in each case represents a vessel for containing liquid to be frozen. $f$ in each case represents a drawer-shaped vessel, also for containing liquid to be converted into ice. They are arranged side by side, and extend nearly to each end of the tank A. The side of the tank A, being easily removed, admits of the ready withdrawal of the ice-vessels for the removal of their frozen contents. $g$ is the inlet-pipe, connecting with the pipe V of the condensing-machine. $h$ is the outlet-pipe for discharge of the air after having absorbed the caloric from the water during the freezing operation. $i$ and $i'$ are close but removable covers of the tank $a$ between the ends of the movable cover $d$ and the ends of the tank.

The operation of this portion of the apparatus is as follows: The condensed air enters the tank $a$ by pipe $g$ through the hollow trunnion at the left end; comes in contact with the end of the inner tank $d$; thence upward over its top edge; thence downward to the bottom of the tank $d$ along its entire length; thence upward over its right end; thence against the partition C; thence downward back the entire length of the tank, over the upper or open surfaces of the series of vessels $f$, around the last one at the left; again traversing the length of the tank beneath said vessels to the right; thence upward and through the pipe $h$ in the right-hand hollow trunnion. Numerous arrows indicate direction at various points. Water is introduced gradually into the main freezing-vessels by a supply-pipe at the left.

In order to cause the current of cold air to pass in complete immediate contact with the air, the bottom of the cover $d$ is kept near the surface of the water, and is slowly raised as the quantity of water increases. The vessels $e$ have their contents frozen without direct contact with the condensed air. The contents of the main vessel $b$ and shallow vessels $f$ are frozen by the direct contact of the freezing air. After the vessels $e$ and $f$ have been removed, the flow of water into $b$ having been stopped, the cover $d$ is raised from the tank, which is then turned bottom up on its trunnion, and the block of ice is discharged freely therefrom.

The cover $d$ may be elevated gradually by the hand of an operative, or it may be operated automatically by any of the well-known applications of power. A series of these ice-formers may be used, in order that while ice is being removed there need be no stoppage of the condensing-engine.

As the air flows from the tank $a$, it will be found to possess, under ordinary conditions, much refrigorific power, for the more perfect utilization of which I attach a water-cooling apparatus, which, while cooling water for use in the condenser and ice-vessels, will also form an additional quantity of ice.

This apparatus is shown on Sheet 6, Fig. 9. It consists of an upright double-walled flat or square sided tank, the sides of which are insulated by means of a non-conducting packing between outer and inner walls.

$l$ is the inlet-pipe, through which the cold air is introduced. $m$ is the outlet-pipe, through which the same is discharged or conveyed to a refrigerating-chamber. The interior of the tank is provided with a series of pans or vessels, $p$, arranged, in the form of shelves, one above the other, and alternated, the first being set with its back edge or side close against the right inner wall, the second toward the left inner wall, and so on to the top. The inside or front edge of each pan passes the vertical center of the tank.

$r$ is the inlet-pipe, through which the supply of water is delivered to the apparatus at or near its top, where it flows into the top pan, thence into the one next below it on the right, and next to the succeeding lower one on the left, and so on until such as is not frozen and left in the pans is discharged into the reservoir $s$; thence into a reservoir, from which the supply for the condenser and freezing operation should be pumped.

As the cold and freezing air passes through the flowing water it absorbs the caloric to a great extent, and in the lower pans ice will be formed fit for withdrawal and use. To accomplish the withdrawal a door should be provided, through which the pans may from time to time be removed.

Figs. 10 and 11 exhibit, in longitudinal and cross vertical sections, a water-freezing apparatus, so arranged that while ice is being removed from a chamber thereof the entire current of freezing air can be directed to another. It consists of a vertical-partitioned two-chambered tank, having a common inlet-passage, No. 5, below, and a common outlet-passage, No. 6, above. Both chambers of the tank open into these passages at a point near the partition. Two revolving valves, $t^1$ and $t^2$, are so set that they may be opened and connect the spaces in both chambers with the upper and lower passages, or, while closing one chamber at top and bottom, will leave the other chamber in full connection. Within the chambers are pan-shaped freezing-vessels $u$, set one above the other. They are of two sizes in width, and arranged so that the freezing air coming in through the passage 5 enters by the open valve $t^1$, and, striking against the bottom of a wide pan, is conducted to the right and left; thence upward against the bottoms of the narrow pans on either side; then inward, and so on until, arriving at the top of the chamber, it passes through the upper valve $t^2$ into the outer passage. By turning the valve the air-passages in the chambers may be alternately closed for the convenience of removing the pans $u$, with their frozen contents, and refilling the same with water.

Having thus described my invention, I claim as new and desire to secure by Letters Patent—

1. The combination of the compound pump B C, valves M N O P, injector R, tank A, water apparatus S, and suitable operative mechanism, substantially as shown and described.

2. The cylinder B and piston G, in combination with the plunger R′ and induction water chamber or pipe R, as and for the purposes specified.

3. The tank A, inner perforated cylinder S, and the funnels $S^2$ and $S^3$, the parts being arranged with relation to each other, and operating, substantially as shown and described.

4. The arrangement of the air-pumps B and C in a vertical line, and connected by the operative mechanism, driven by a single crank on a central shaft, substantially as and for the purpose described.

5. The freezing apparatus, Fig. 6, consisting of the tank $a$, mounted upon trunnions, in combination with the inner tank $c$ and cover $d$.

6. The combination of the outer and inner tanks $a$ and $c$, the same being provided, essentially, with a gradual feeding apparatus for the introduction of liquid to be frozen, a cold-air-inlet pipe, and corresponding discharge-pipe, with the vertical sliding box-shaped cover $d$, for the purpose of securing a flow of cold air in a current adjacent to and on a plane with the surface of the liquid to be frozen, substantially as shown and described.

7. In combination, the main tank $a$, inner tank $c$, cover $d$, and freezing-vessels $f$, arranged substantially as shown and described.

FR. WINDHAUSEN.

Witnesses:
   B. B. LYCENNETT,
   C. MARCH.